(12) United States Patent
Kim et al.

(10) Patent No.: US 8,437,260 B2
(45) Date of Patent: May 7, 2013

(54) VICTIM SYSTEM DETECTOR, METHOD OF DETECTING A VICTIM SYSTEM, WIRELESS COMMUNICATION DEVICE AND WIRELESS COMMUNICATION METHOD

(75) Inventors: Ji-Ho Kim, Seongnam-si (KR); Jae-Do Roh, Seoul (KR); Jae-Seok Kim, Seoul (KR); Sang-Min Lee, Seoul (KR); Yun-Ho Jung, Paju-si (KR)

(73) Assignees: Samsung Electronics Co., Ltd., Suwon-si, Gyeonggi-Do (KR); Industry-Academic Cooperation Foundation, Yonsei University, Seodaemun-Gu, Seoul (KR)

( * ) Notice: Subject to any disclaimer, the term of this patent is extended or adjusted under 35 U.S.C. 154(b) by 1068 days.

(21) Appl. No.: 12/397,876

(22) Filed: Mar. 4, 2009

(65) Prior Publication Data

US 2010/0165827 A1  Jul. 1, 2010

(30) Foreign Application Priority Data

Dec. 29, 2008  (KR) ........................ 10-2008-0135263

(51) Int. Cl.
*H04J 1/16* (2006.01)

(52) U.S. Cl.
USPC ........................... 370/241; 370/343; 455/67.1

(58) Field of Classification Search ........................ None
See application file for complete search history.

(56) References Cited

U.S. PATENT DOCUMENTS

| 2002/0154620 A1* | 10/2002 | Azenkot et al. ............... 370/347 |
| 2003/0119442 A1* | 6/2003 | Kwak et al. ................... 455/3.05 |
| 2004/0179485 A1* | 9/2004 | Terrier .......................... 370/310 |
| 2005/0215217 A1* | 9/2005 | Birgenheier et al. ....... 455/226.1 |
| 2007/0298721 A1* | 12/2007 | Mishra et al. ................ 455/66.1 |
| 2008/0225931 A1* | 9/2008 | Proctor et al. ................ 375/214 |

FOREIGN PATENT DOCUMENTS

| JP | 2007-166068 | 6/2007 |
| JP | 2007-258904 | 10/2007 |
| JP | 2007-336054 | 12/2007 |
| KR | 1020080016337 | 2/2008 |

OTHER PUBLICATIONS

English Abstract for Publication No. 2007-166068.
English Abstract for Publication No. 2007-258904.
English Abstract for Publication No. 2007-336054.
English Abstract for Publication No. 1020080016337.

\* cited by examiner

*Primary Examiner* — Kevin C Harper
*Assistant Examiner* — Samina Choudhry
(74) *Attorney, Agent, or Firm* — F. Chau & Associates, LLC

(57) ABSTRACT

A victim system detector for detecting whether a second wireless communication system uses frequency bands that are used by a first wireless communication system (detecting whether the second wireless communication system is a victim system) includes a correlator and a decision unit. The correlator calculates a correlation value between a frequency domain baseband signal associated with the first wireless communication system and a correlation sequence of the second wireless communication system. The decision unit determines, based on the correlation value, whether the second wireless communication system is a victim system. Therefore, the victim system is detected accurately and efficiently.

28 Claims, 10 Drawing Sheets

VICTIM SYSTEM DETECTOR, METHOD OF DETECTING A VICTIM SYSTEM, WIRELESS COMMUNICATION DEVICE AND WIRELESS COMMUNICATION METHOD

CROSS REFERENCE TO RELATED APPLICATIONS

This application claims priority to Korean Patent Application No. 10-2008-0135263, filed Dec. 29, 2008, the contents of which are herein incorporated by reference in its entirety.

BACKGROUND

1. Technical Field

Exemplary embodiments relate to a wireless communication technology, and more particularly, to a victim system detector, a method of detecting a victim system, a wireless communication device and a wireless communication method.

2. Discussion of the Related Art

Recently, frequency bands used by various wireless communication systems overlap one another due to limited availability of frequency resources. For example, an ultra wideband (UWB) communication system and a worldwide interoperability for microwave access (WiMAX) communication system partly share a frequency band in some regions, such as Korea, Japan, Europe, etc.

When two such wireless communications systems use overlapping frequency bands, there is a tendency for one wireless communication system to interfere with the communication of another wireless communication system. An example of this interference is co-channel interference (CCI) (also known as crosstalk). The wireless communication system that is affected by this interference is known as a victim system.

In a wireless communication environment where multiple wireless communication systems share frequency bands, one wireless communication system should have the ability to detect the existence of another wireless communication system operating within the same or overlapping frequency bands to avoid interference between the wireless communication systems. Accordingly, it may be desirable for a wireless communication system to have the ability to detect the existence of a victim system.

SUMMARY

Exemplary embodiments provide a victim system detector with a small size that can accurately and efficiently detect a victim system.

Exemplary embodiments provide a method of detecting a victim system accurately and efficiently.

Exemplary embodiments provide a wireless communication device that can accurately and efficiently detect a victim system and avoid interference with the victim system.

Exemplary embodiments provide a wireless communication method for accurately and efficiently detecting a victim system and avoiding interference with the victim system.

According to some exemplary embodiments, a victim system detector includes a correlator and a decision unit.

The correlator calculates a correlation value between a frequency domain baseband signal associated with a first wireless communication system and a correlation sequence of a second wireless communication system. The decision unit determines, based on the correlation value, whether the second wireless communication system is a victim system.

In an exemplary embodiment, the frequency domain baseband signal may be generated by converting a wireless signal received in the first wireless communication system.

In an exemplary embodiment, the correlation sequence may be generated by converting a periodic signal of the second wireless communication system into a frequency domain signal.

In an exemplary embodiment, the correlation sequence may be generated by converting a preamble signal of the second wireless communication system into a frequency domain signal.

In an exemplary embodiment, the correlator may calculate at least one bin-correlation value between at least one bin of the frequency domain baseband signal corresponding to a frequency band used in the second wireless communication system and at least one bin of the correlation sequence corresponding to the frequency band, and calculate the correlation value based on the at least one bin-correlation value.

In an exemplary embodiment, the correlator may calculate a plurality of bin-correlation values between a plurality of bins of the frequency domain baseband signal and a plurality of bins of the correlation sequence. The plurality of bins of the frequency domain baseband signal correspond to the plurality of bins of the correlation sequence, respectively. The correlator calculates the correlation value based on the plurality of bin-correlation values. The correlator may calculate the correlation value by multiplying the plurality of bin-correlation values. The correlator may calculate the correlation value by summing the plurality of bin-correlation values.

In an exemplary embodiment, the victim system detector may further include a bin selector configured to select at least one bin of the frequency domain baseband signal corresponding to a frequency band used in the second wireless communication system from a plurality of bins of the frequency domain baseband signal. The correlator may receive the at least one bin of the frequency domain baseband signal from the bin selector and calculate at least one bin-correlation value between the at least one bin of the frequency domain baseband signal and at least one bin of the correlation sequence. The at least one bin of the correlation sequence corresponds to the at least one bin of the frequency domain baseband signal and the correlator calculates the correlation value based on the at least one bin-correlation value.

In an exemplary embodiment, the victim system detector may further include a correlation sequence storing unit configured to store the correlation sequence of the second wireless communication system. The correlation sequence storing unit may further store at least one correlation sequence of at least one wireless communication system having a communication standard that is different from a communication standard of the second wireless communication system.

In an exemplary embodiment, the victim system detector may further include a threshold adjusting unit configured to generate a threshold value based on communication information provided from an external device. The decision unit may receive the threshold value from the threshold adjusting unit, and determine, by comparing the correlation value with the threshold value, whether the second wireless communication system is the victim system. The decision unit may determine that the second wireless communication system is the victim system when the correlation value is higher than the threshold value. The communication information may include received signal strength information, channel state information, and/or bandwidth information.

In an exemplary embodiment, the victim system detector may further include a spectral power measurement unit configured to measure power of the frequency domain baseband signal, and configured to generate type information of the second wireless communication system based on the measured power. The victim system detector may further include a correlation sequence storing unit configured to store the correlation sequence of the second wireless communication system and at least one correlation sequence of at least one wireless communication system having a communication standard that is different from a communication standard of the second wireless communication system. The victim system detector may further include a bin selector configured to select at least one bin of the frequency domain baseband signal from a plurality of bins of the frequency domain baseband signal based on the type information. The at least one bin of the frequency domain baseband signal selectively corresponds to a frequency band used in the second wireless communication system or a frequency band used in the at least one wireless communication system according to the type information. The correlator may receive the at least one bin of the frequency domain baseband signal from the bin selector. The correlator may read a correlation sequence selected from the correlation sequence of the second wireless communication system and the at least one correlation sequence of the at least one wireless communication system from the correlation sequence storing unit according to the type information. The correlator may calculate the correlation value between the at least one bin of the frequency domain baseband signal and the selected correlation sequence read from the correlation sequence storing unit. The victim system detector may operate in an idle mode when the type information represents that no victim system is detected.

According to some exemplary embodiments, there is provided a method of detecting a victim system. A correlation value between a frequency domain baseband signal associated with a first wireless communication system and a correlation sequence of a second wireless communication system is calculated. It is determined, based on the correlation value, whether the second wireless communication system is a victim system.

According to some exemplary embodiments, a wireless communication device includes an antenna, a radio frequency (RF) unit and a baseband processor.

The antenna receives a wireless signal in a first wireless communication system. The RF unit receives the wireless signal from the antenna and converts the wireless signal into a baseband signal. The baseband processor performs a data processing operation based on the baseband signal. The baseband processor includes an analog-digital converter (ADC) configured to convert the baseband signal into a digital baseband signal, a frequency domain converter configured to convert the digital baseband signal into a frequency domain baseband signal, and a victim system detector configured to calculate a correlation value between the frequency domain baseband signal and a correlation sequence of a second wireless communication system. The victim system detector is also configured to determine, based on the correlation value, whether the second wireless communication system is a victim system.

In an exemplary embodiment, the baseband processor may further include a victim system avoidance unit configured to reduce interference with the second wireless communication system when the second wireless communication system is a victim system. The victim system avoidance unit may include a notch filter configured to decrease a power level of a wireless signal to be transmitted in the first wireless communication system in a frequency band used in the second wireless communication system.

In an exemplary embodiment, the wireless communication device may further include a correlation sequence generating device. The correlation sequence generating device may include a sampling unit configured to sample a periodic signal of the second wireless communication system, a frequency domain converter configured to convert the sampled signal into a frequency domain signal, and a bin selector configured to select at least one bin corresponding to a frequency band used in the second wireless communication system from a plurality of bins of the frequency domain signal as the correlation sequence. The sampling unit may adjust a bandwidth of the periodic signal to a bandwidth for the first wireless communication system. The periodic signal may be a preamble signal of the second wireless communication system.

According to some exemplary embodiments, a wireless communication method is provided. A wireless signal is received in a first wireless communication system. The wireless signal is converted into a baseband signal. The baseband signal is converted into a digital baseband signal. The digital baseband signal is converted into a frequency domain baseband signal. A correlation value between the frequency domain baseband and a correlation sequence of a second wireless communication system is calculated. It is determined, based on the correlation value, whether the second wireless communication system is a victim system. Interference with the second wireless communication system is reduced when the second wireless communication system is a victim system.

According to some exemplary embodiments, a victim system is detected with small size by calculating a correlation in the frequency domain. Further, according to some exemplary embodiments, a victim system is accurately and efficiently detected by calculating a correlation in the frequency domain.

BRIEF DESCRIPTION OF THE DRAWINGS

Illustrative, non-limiting exemplary embodiments will be more clearly understood from the following detailed description taken in conjunction with the accompanying drawings, in which.

DETAILED DESCRIPTION OF THE EXEMPLARY EMBODIMENTS

Figure 1:
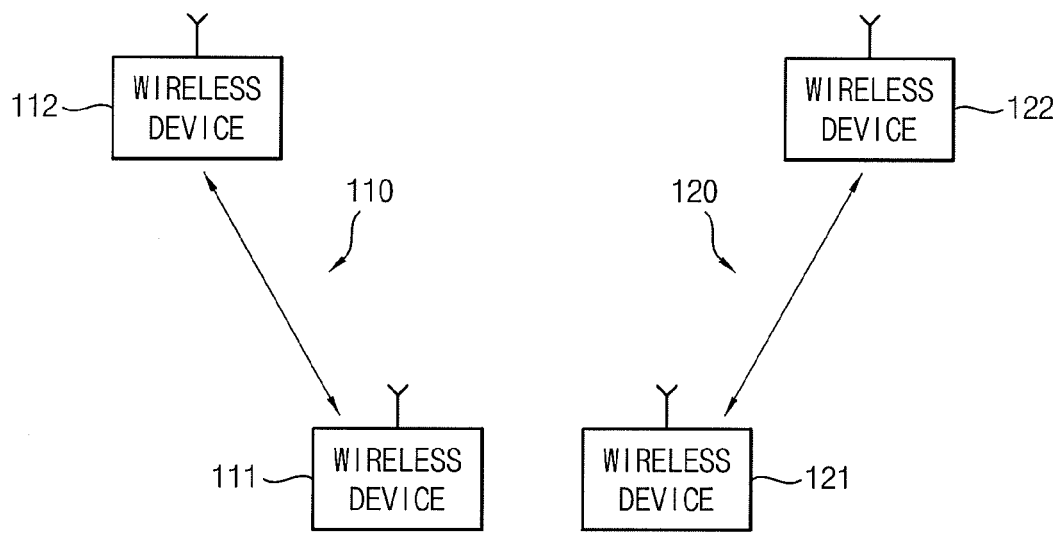
FIG. 1 is a block diagram illustrating a wireless communication environment where wireless communication systems sharing a frequency band coexist.

Various exemplary embodiments will be described more fully hereinafter with reference to the accompanying drawings, in which some exemplary embodiments are shown. The present invention may, however, be embodied in many different forms and should not be construed as limited to the exemplary embodiments set forth herein. In the drawings, the sizes and relative sizes of layers and regions may be exaggerated for clarity. Like numerals may refer to like elements throughout.

It will be understood that when an element is referred to as being "connected" or "coupled" to another element, it can be directly connected or coupled to the other element or intervening elements may be present.

FIG. 1 is a block diagram illustrating a wireless communication environment where wireless communication systems sharing a frequency band coexist.

Referring to FIG. 1, a first wireless communication system 110 coexists with a second wireless communication system 120. The first wireless communication system 110 includes a first wireless communication device 111 and a second wireless communication device 112. The second wireless communication system 120 includes a third wireless communication device 121 and a fourth wireless communication device 122.

In the first wireless communication system 110, the first wireless communication device 111 communicates with the second wireless communication device 112. In the second wireless communication system 120, the third wireless communication device 121 communicates with the fourth wireless communication device 122. When a frequency band used in the first wireless communication system 110 partly or entirely overlaps with a frequency band used in the second wireless communication system 120, interference may occur between the first wireless communication system 110 and the second wireless communication system 120. In this case, at least one of the first wireless communication system 110 and the second wireless communication system 120 detects the other wireless communication system to avoid interference.

For example, the first wireless communication system 110 may detect the existence of the second wireless communication system 120 to avoid interference with the second wireless communication system 120. Upon detecting the existence of the second wireless communication system 120, the first wireless communication system 110 may reduce power of a wireless signal below a predetermined level in the frequency band used in the second wireless communication system 120.

For example, where the third wireless communication device 121 is a slave device and the fourth wireless communication device 122 is a master device, the first wireless communication device 111 may detect the existence of the second wireless communication system 120 by receiving an uplink signal transferred from the third wireless communication device 121 to the fourth wireless communication device 122, and reduce power of a wireless transmission signal to the second wireless communication device 112 below a predetermined level in the frequency band used in the second wireless communication system 120. The first wireless communication device 111 may detect the existence of the second wireless communication system 120 by determining whether a wireless signal received by an antenna of the first wireless communication device 111 includes the uplink signal from the second wireless communication system 120. For example, the first wireless communication device 111 may determine whether the wireless signal includes at least a portion of the uplink signal of which a frequency band partly or entirely overlaps with the frequency band of the wireless signal, and thereby the first wireless communication device 111 may determine whether the second wireless communication system 120 is a victim system. In some embodiments, the first wireless communication device 111 may convert the wireless signal into a frequency domain baseband signal, calculate a correlation value between the frequency domain baseband signal and the uplink signal, and determine, based on the correlation value, whether the wireless signal includes the uplink signal. Where it is determined that the wireless signal includes the uplink signal, the existence of the second wireless communication system 120 is detected.

For example, the first wireless communication device 111 may detect a downlink signal transferred from the fourth wireless communication device 122 to the third wireless communication device 121, and may reduce power of a transmission signal to the second wireless communication device 112 below a predetermined level in the frequency band used in the second wireless communication system 120. In some embodiments, the first wireless communication device 111 may receive a wireless signal via an antenna, and may detect the existence of the second wireless communication system 120 by determining whether the wireless signal includes the downlink signal.

Figure 2:
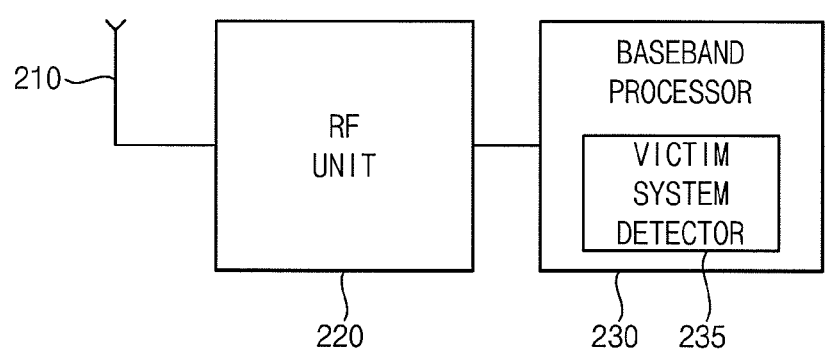
FIG. 2 is a block diagram illustrating a wireless communication device according to some exemplary embodiments.

FIG. 2 is a block diagram illustrating a wireless communication device according to some exemplary embodiments.

Referring to FIG. 2, the wireless communication device 200 includes an antenna 210, a radio frequency (RF) unit 220 and a baseband processor 230. For example, the wireless communication device 200 may be one of the first, second, third and fourth wireless communication devices 111, 112, 121 and 122 illustrated in FIG. 1.

The antenna 210 may receive a wireless signal in a first wireless communication system. The antenna 210 may transmit a wireless transmission signal provided from the RF unit 220.

The RF unit 220 may receive the wireless signal from the antenna 210, and convert the wireless signal into a baseband signal. The RF unit 220 may convert a baseband transmission signal provided from the baseband processor 230 into the wireless transmission signal. In some embodiments, the RF unit 220 may directly-convert the wireless signal into the baseband signal. In other embodiments, the RF unit 220 may convert the wireless signal into an intermediate frequency (IF) signal, and then convert the IF signal into the baseband signal.

The baseband processor 230 may receive the baseband signal from the RF unit 220, and perform data processing based on the baseband signal. The baseband processor 230 may generate the baseband transmission signal and provide the baseband transmission signal to the RF unit 220.

The baseband processor 230 includes a victim system detector 235 for detecting a victim system. The baseband processor 230 may generate a digital baseband signal by sampling the baseband signal and converting the digital baseband signal into a frequency domain baseband signal. The victim system detector 235 may receive the frequency domain baseband signal, calculate a correlation value between the frequency domain baseband signal and a correlation sequence of a second wireless communication system, and determine, based on the correlation value, whether the second wireless communication system is a victim system. For example, the victim system detector 235 may determine, based on the correlation value, whether the frequency domain baseband signal includes a signal of the second wireless communication system. The victim system detector 235 may then determine whether the second wireless communication system is a victim system based on whether the frequency domain baseband signal includes the signal of the second wireless communication system. Accordingly, the victim system detector 235 may detect an existence of the second wireless communication system. The correlation sequence may be a sequence generated by converting a periodic signal transmitted and/or received in the second wireless communication system into a frequency domain signal.

In some embodiments, the correlation sequence may be a sequence generated by converting a preamble signal of the second wireless communication system into a frequency domain signal. The preamble signal is a known sequence having a periodic characteristic in the time domain. The correlation sequence generated from the preamble signal has a high auto-correlation value since the preamble signal has the periodic characteristic. Since the auto-correlation value of the correlation sequence is high, a cross-correlation value between the frequency domain baseband signal and the correlation sequence is high when the wireless signal received in a first wireless communication system includes a wireless signal transmitted and/or received in the second wireless communication system. Thus, the victim system detector 235 may easily detect the existence of the second wireless communication system, or the victim system, based on the cross-correlation value between the frequency domain baseband signal and the correlation sequence. In some embodiments, when the cross-correlation value is higher than a threshold value, the victim system detector 235 may determine that the second wireless communication system is a victim system, and thus the victim system detector 235 may recognize the existence of the second wireless communication system as the victim system.

In the wireless communication device 200 according to some exemplary embodiments, a filtering circuit and a down-sampling circuit for recovering a victim system signal may be omitted since the wireless communication device 200 detects the victim system by using the correlation value calculated in the frequency domain. Thus, size and/or hardware complexity of the victim system detector 235 may be reduced in the wireless communication device 200. Further, the wireless communication device 200 according to some exemplary embodiments may accurately and efficiently detect the victim system by using the victim system signal having a periodic characteristic.

Figure 3:
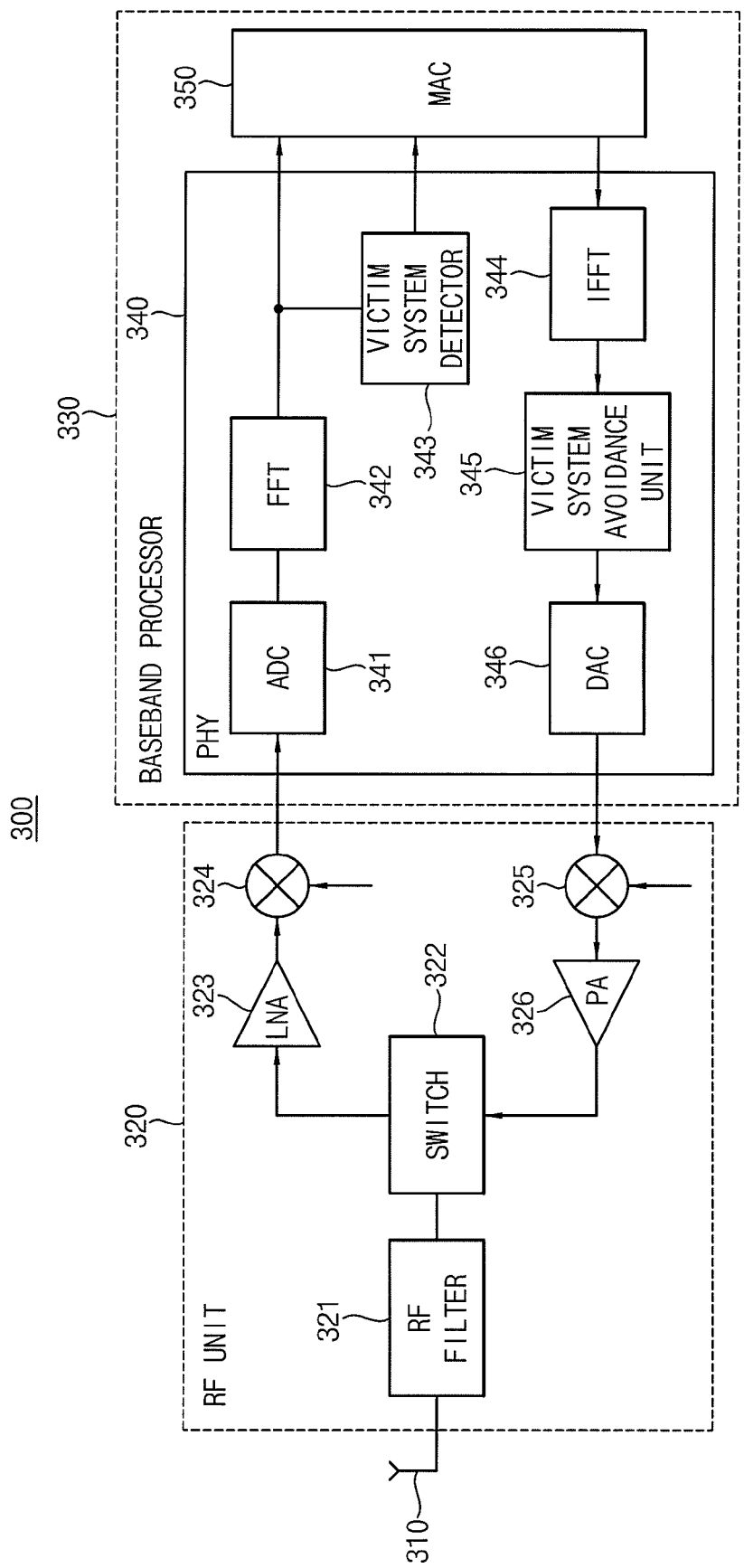
FIG. 3 is a block diagram illustrating a wireless communication device according to some exemplary embodiments.

FIG. 3 is a block diagram illustrating a wireless communication device according to some exemplary embodiments.

Referring to FIG. 3, the wireless communication device 300 includes an antenna 310, an RF unit 320 and a baseband processor 330. For example, the wireless communication device 300 may be one of the first, second, third and fourth wireless communication devices 111, 112, 121 and 122 illustrated in FIG. 1.

The antenna 310 may receive a wireless signal in a first wireless communication system. The antenna 310 may transmit a wireless transmission signal provided from the RF unit 320. In some cases, the wireless signal received in the first wireless communication system may include a portion or all of a wireless signal transmitted and/or received in a second wireless communication system. For example, the first and second wireless communication systems may overlap each other both in a service region and in a frequency band. In this case, the wireless communication device 300 may detect a victim system by determining whether a wireless reception signal includes a wireless signal of the victim system and avoid interference with the victim system by reducing power of a wireless transmission signal in a frequency band used in the victim system.

The RF unit 320 may receive the wireless signal from the antenna 310 and may convert the wireless signal into a baseband signal. The RF unit 320 may convert a baseband transmission signal provided from the baseband processor 330 into the wireless transmission signal. The RF unit 320 may include an RF filter 321, a switch 322, a low noise amplifier (LNA) 323, a reception mixer 324, a transmission mixer 325 and a power amplifier (PA) 326. The RF filter 321 may be a band-pass filter for eliminating noise or an out-of-band signal of the wireless signal received by the antenna 310. The RF filter 321 may eliminate out-of-band spurious components of the wireless transmission signal by filtering the wireless transmission signal provided from the PA 326 via the switch 322. In some embodiments, The RF filter 321 may be a pre-select filter that selects a sub-band for frequency hopping. In a reception mode, the switch 322 may connect the RF filter 321 with a reception path to provide the wireless signal received by the antenna 310. In a transmission mode, the switch 322 may connect the RF filter 321 with a transmission path to transmit the wireless transmission signal by the antenna 310.

The LNA 323 may receive the wireless signal filtered by the RF filter 321, and amplify the wireless signal. The LNA 323 may have a low noise figure to minimize influence of noise. The reception mixer 324 may down-convert the wireless signal amplified by the LNA 323 into the baseband signal. For example, the reception mixer 324 may down-convert the wireless signal into the baseband signal by mixing the wireless signal with a local oscillation signal generated from a local oscillator. In some embodiments, the reception mixer 324 may down-convert the wireless signal into an in-phase baseband signal and a quadrature baseband signal by using the local oscillation signal and a shifted local oscillation signal of which a phase is shifted from the local oscillation signal by 90 degrees.

The transmission mixer 325 may up-convert the baseband transmission signal provided from the baseband processor 330 into the wireless transmission signal. For example, the transmission mixer 325 may up-convert the baseband transmission signal into the wireless transmission signal by mixing the baseband transmission signal with the local oscillation signal. In some embodiments, the transmission mixer 325 may up-convert an in-phase baseband transmission signal and a quadrature baseband transmission signal into an in-phase wireless transmission signal and a quadrature wireless transmission signal, respectively, by using the local oscillation signal and the shifted local oscillation signal of which the phase is shifted from the local oscillation signal by 90 degrees. The PA 326 may receive the wireless transmission signal, and amplify the wireless transmission signal to have a predetermined power level.

The RF unit 320 may have various configurations according to communication types or communication standards of the first wireless communication system. For example, while the RF unit 320 is illustrated as a direct conversion receiver (DCR) in FIG. 3, the RF unit 320 may be an IF transceiver or a low-IF transceiver. In some embodiments, the RF unit 320 may further include a variable gain amplifier (VGA) for amplifying the wireless signal or the wireless transmission signal. In some embodiments, the RF unit 320 may further include a low-pass filter for extracting in-band components from the wireless signal or the wireless transmission signal.

The baseband processor 330 may receive the baseband signal from the RF unit 320, and process data based on the baseband signal. The baseband processor 330 may generate the baseband transmission signal, and provide the baseband transmission signal to the RF unit 320. The baseband processor 330 may include a physical layer processor (PHY) 340 and a media access controller (MAC) 350.

The PHY 340 may convert the baseband signal received from the RF unit 320 into a frequency domain baseband signal, generate a data stream by demodulating the frequency domain baseband signal, and provide the data stream to the MAC 350. The PHY 340 may receive a transmission data stream from the MAC 350, generate the baseband transmission signal by modulating the transmission data stream, and provide the baseband transmission signal to the RF unit 320. The PHY 340 may include an analog-digital converter (ADC) 341, a frequency domain converter 342, a victim system detector 343, a time domain converter 344, a victim system avoidance unit 345 and a digital-analog converter (DAC) 346.

The ADC 341 may convert the baseband signal into a digital baseband signal by sampling the baseband signal. The frequency domain converter 342 may convert the digital baseband signal that is in the time domain into the frequency domain baseband signal that is in the frequency domain. In some embodiments, the frequency domain converter 342 may be a fast Fourier transformer (FFT). In some embodiments, the PHY may further include a demapper, a deinterleaver and a channel decoder for demodulating the frequency domain baseband signal.

The victim system detector 343 may receive the frequency domain baseband signal from the frequency domain converter 342, and determine whether the second wireless communication system is a victim system by calculating a correlation value between the frequency domain baseband signal and a correlation sequence. Accordingly, the victim system detector 343 may detect the existence of the second wireless communication system and determine that it is a victim system. In some embodiments, the correlation sequence may be generated by converting a periodic signal transmitted and/or received in the second wireless communication system into a frequency domain signal. In some embodiments, the correlation sequence may be generated by converting a preamble signal of the second wireless communication system into a frequency domain signal. The victim system detector 343 may provide the MAC 350 or the victim system avoidance unit 345 with a detection result on whether the second wireless communication system is a victim system.

While the victim system detector 343 is illustrated in FIG. 3 as included in the PHY 340, a portion or all of elements of the victim system detector 343 may be included in the MAC 350 or the RF unit 320. The details of the victim system detector 343 will be described later with reference to FIGS. 5 through 12.

The PHY 340 may receive the transmission data stream from the MAC 350 and generate a frequency domain baseband transmission signal by modulating the transmission data stream. In some embodiments, the PHY 340 may further include a channel encoder, an interleaver and a mapper for modulating the frequency domain baseband transmission signal. The time domain converter 344 may convert the frequency domain baseband transmission signal that is in a frequency domain into a digital baseband transmission signal that is in a time domain. In some embodiments, the time domain converter 344 may be an inverse fast Fourier transformer (IFFT). The victim system avoidance unit 345 may avoid interference with the second wireless communication system in response to the detection result received from the victim system detector 343 or a control signal received from the MAC 350. The DAC 346 may receive the digital baseband transmission signal, of which the power level is decreased in the frequency band used in the second wireless communication system, and convert the digital baseband transmission signal that is a digital signal into the baseband transmission signal that is an analog signal. The DAC 346 may provide the baseband transmission signal to the RF unit 320.

The victim system avoidance unit 345 may avoid interference with the second wireless communication system in various manners. In some embodiments, the victim system avoidance unit 345 may be a notch filter that filters the digital baseband transmission signal to reduce power in the frequency band used in the second wireless communication system. In other embodiments, the victim system avoidance unit 345 may not use a sub-band including the frequency band used in the second wireless communication system among a plurality of sub-bands (e.g., three sub-bands, each having a bandwidth of 528 MHz) used in the first wireless communication system. For example, the victim system avoidance unit 345 may perform frequency hopping between the sub-bands (e.g., two sub-bands) other than the sub-band including the frequency band used in the second wireless communication system and the first wireless communication system may avoid interference with the second wireless communication system. In other embodiments, the victim system avoidance unit 345 may null at least one tone of the frequency domain baseband transmission signal such that, in the first wireless communication system, at least one null tone is transferred on at least one subcarrier corresponding to the frequency band used in the second wireless communication system. In other embodiments, the victim system avoidance unit 345 may avoid interference in a subcarrier by nulling at least one tone of the frequency domain baseband transmission signal and may also employ one or more of frequency windowing and subcarrier cancellation techniques to mitigate interference. In some embodiments, the victim system avoidance unit 345 may use two or more avoidance techniques such as those described above. While the victim system avoidance unit 345 is illustrated in FIG. 3 as connected between the time domain converter 344 and the DAC 346, a portion or all of the elements of the victim system avoidance unit 345 may be located between the MAC 350 and the time domain converter 344 or may be included in the MAC 350 or the RF unit 320.

The wireless communication device 300 may further include a correlation sequence generating device. The details of the correlation sequence generating device will be described later with reference to FIGS. 13 through 15.

The wireless communication device 300 according to some exemplary embodiments may not need a filtering circuit and a down-sampling circuit for recovering a victim system signal since the wireless communication device 300 detects the victim system by using the correlation value calculated in the frequency domain. Thus, size and/or hardware complexity of the victim system detector 343 may be reduced in the wireless communication device 300. Further, the wireless communication device 300 according to some exemplary embodiments may accurately and efficiently detect the victim system by using the victim system signal having a periodic characteristic. In addition, the wireless communication device 300 may efficiently avoid interference with the victim system by accurately detecting existence of the victim system.

Figure 4:
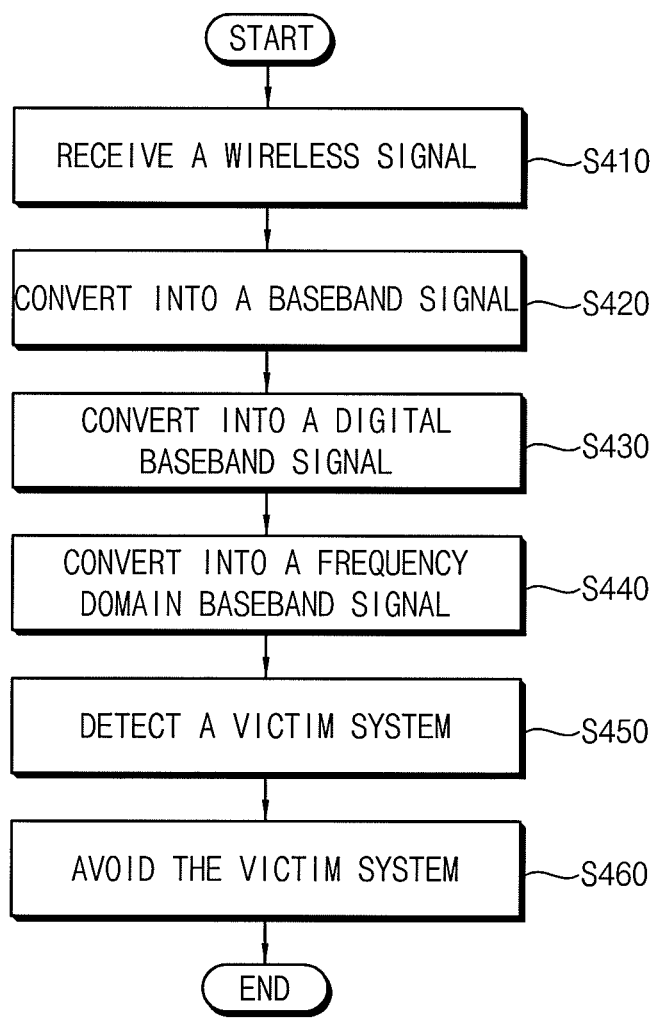
FIG. 4 is a flow chart illustrating a wireless communication method according to some exemplary embodiments.

FIG. 4 is a flow chart illustrating a wireless communication method according to some exemplary embodiments.

Referring to FIGS. 3 and 4, an antenna 321 may receive a wireless signal in a first wireless communication system (step S410). An RF unit 320 may convert the wireless signal into a baseband signal (step S420). An ADC 341 may convert the baseband signal that is an analog signal into a digital baseband signal that is a digital signal (step S430). A frequency domain converter 342 may convert the digital baseband signal that is in a time domain into a frequency domain baseband signal that is in a frequency domain (step S440). A victim system detector 343 may calculate a correlation value between the frequency domain baseband signal and a correlation sequence and detect a victim system based on the correlation value (step S450). If the victim system is detected, a victim system avoidance unit 345 may avoid the victim system (step S460), for example, by reducing interference with the victim system.

The wireless communication method according to some exemplary embodiments may efficiently detect and avoid the victim system by calculating the correlation value in the frequency domain.

Figure 5:
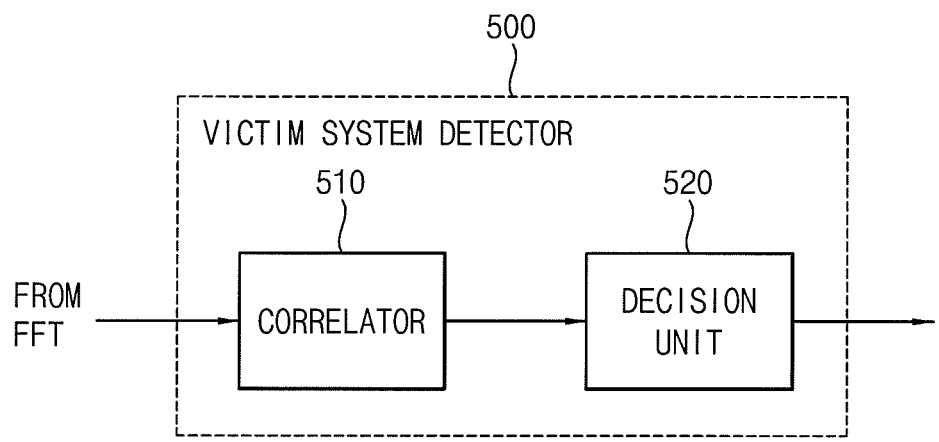
FIG. 5 is a block diagram illustrating a victim system detector according to some exemplary embodiments.

FIG. 5 is a block diagram illustrating a victim system detector according to some exemplary embodiments.

Referring to FIG. 5, the victim system detector 500 includes a correlator 510 and a decision unit 520. For example, the victim system detector 500 may be the victim system detector 235 included in the wireless communication device 200 of FIG. 2 or the victim system detector 343 included in the wireless communication device 300 of FIG. 3.

The correlator 510 may receive a frequency domain baseband signal converted from a wireless signal received in a first wireless communication system. For example, the correlator 510 may receive the frequency domain baseband signal from the frequency domain converter 342 illustrated in FIG. 3. The correlator 510 calculates a correlation value between the frequency domain baseband signal and a correlation sequence of a second wireless communication system. In some embodiments, the correlation sequence is stored in the correlator 510 or in the MAC 350 illustrated in FIG. 3. The correlator 510 may calculate the correlation value by using the stored correlation sequence. In some embodiments, the correlation sequence may be generated by converting a periodic signal transmitted and/or received in the second wireless communication system into a frequency domain signal. For example, the periodic signal may be a preamble sequence that is a known sequence of the second wireless communication system.

In some embodiments, the correlator 510 may calculate the correlation value by calculating a correlation value per frequency tone. For example, the correlator 510 may calculate bin-correlation values between bins of the frequency domain baseband signal and bins of the correlation sequence where the bins of the correlation sequence correspond to the bins of the frequency domain baseband signal, respectively, and calculate the correlation value based on the bin-correlation values. Here, a bin may be a sequence of digital values for a frequency tone of a frequency domain signal. When a bin corresponds to another bin, the both bins may be sequences for the same frequency tone. In some embodiments, the correlator 510 may calculate the correlation value by multiplying the bin-correlation values. In other embodiments, the correlator 510 may calculate the correlation value by summing the bin-correlation values.

In some embodiments, the correlator 510 may calculate the correlation value by calculating at least one correlation value for at least one frequency tone within a frequency band used in the second wireless communication system. For example, the correlator 510 may calculate at least one bin-correlation value between at least one bin of the frequency domain baseband signal and at least one bin of the correlation sequence within the frequency band used in the second wireless communication system where the at least one bin of the correlation sequence corresponds to the at least one bin of the frequency domain baseband signal. The correlator 510 calculates the correlation value based on the at least one bin-correlation value. Here, a bin within a frequency band may be a sequence of digital values for a frequency tone within the frequency band. In some embodiments, when there is more than one bin, the correlator 510 may calculate the correlation value by multiplying or summing the at least one bin-correlation value.

For example, where the first wireless communication system is an ultra wideband (UWB) communication system, and the second wireless communication system is a worldwide interoperability for microwave access (WiMAX) communication system, a signal transmitted and/or received in the first wireless communication system has a bandwidth of about 528 MHz and a signal transmitted and/or received in the second wireless communication system has a bandwidth ranging from about 1 MHz to about 20 MHz. Since the frequency domain baseband signal includes 128 frequency tones having uniform intervals in the UWB communication system, each frequency tone of the frequency domain baseband signal corresponds to a bandwidth of about 4.125 MHz in the first wireless communication system. When the second wireless communication system is the WiMAX communication system having a bandwidth of about 10 MHz, two or three frequency tones of the first wireless communication system may correspond to a frequency band used in the second wireless communication system according to a center frequency of the second wireless communication signal. In this case, the correlator 510 may calculate two or three bin-correlation values between two or three bins of the frequency domain baseband signal and two or three bins of the correlation sequence where the two or three bins of the frequency domain baseband signal correspond to the two or three frequency tones, respectively, and the two or three bins of the correlation sequence correspond to the two or three frequency tones, respectively. The correlator 510 may calculate the correlation value by multiplying or summing the two or three bin-correlation values.

The decision unit 520 may receive the correlation value from the correlator 510, and determine, based on the correlation value, whether the second wireless communication system is a victim system. For example, the decision unit 520 may determine that the frequency domain baseband signal includes a signal of the second wireless communication system when the correlation value is higher than a threshold value and thus determine that the second wireless communication system is a victim system.

As described above, the victim system detector according to some exemplary embodiments need not include a filtering circuit and a down-sampling circuit for recovering a victim system signal since the correlation value is calculated in the frequency domain. Accordingly, the victim system detector according to some exemplary embodiments may have a small size and low hardware complexity. The victim system detector according to some exemplary embodiments may accurately and efficiently detect the victim system by using the victim system signal having a periodic characteristic.

Figure 6:
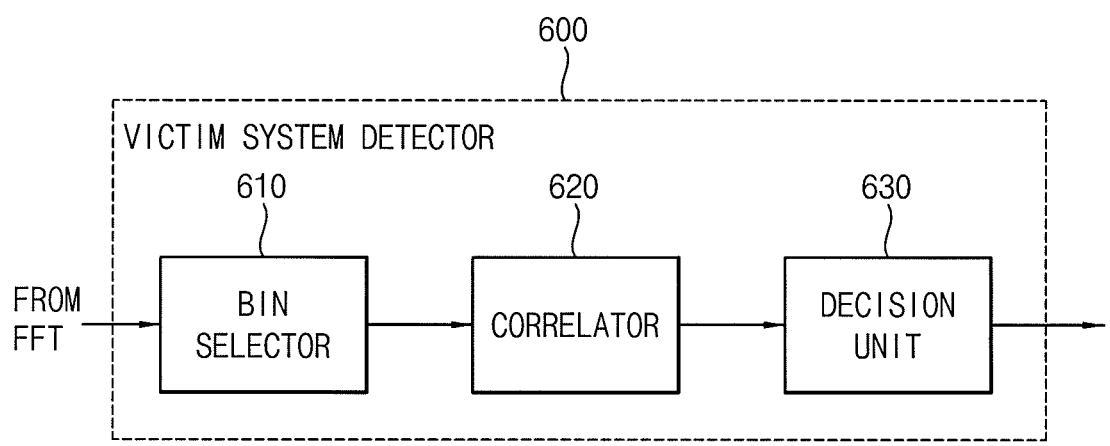
FIG. 6 is a block diagram illustrating a victim system detector according to some exemplary embodiments.

FIG. 6 is a block diagram illustrating a victim system detector according to some exemplary embodiments.

Referring to FIG. 6, the victim system detector 600 includes a bin selector 610, a correlator 620 and a decision unit 630. For example, the victim system detector 600 may be the victim system detector 235 included in the wireless communication device 200 of FIG. 2 or the victim system detector 343 included in the wireless communication device 300 of FIG. 3. Compared to the victim system detector 500 of FIG. 5, the victim system detector 600 further includes the bin selector 610.

The bin selector 610 may receive a frequency domain baseband signal of a first wireless communication system. For example, the bin selector 610 may receive the frequency domain baseband signal from the frequency domain converter 342 illustrated in FIG. 3. The bin selector 610 may select at least one bin corresponding to a frequency band used in a second wireless communication system from a plurality of bins of the frequency domain baseband signal. For example, the bin selector 610 may select one or more bins within the frequency band used in the second wireless communication system. In some embodiments, at least one frequency tone corresponding to the at least one bin selected by the bin selector 610 may be predetermined according to a communication type or a communication standard of the second wireless communication system. In some embodiments, the at least one frequency tone may be determined in response to a control signal provided from the MAC 350 illustrated in FIG. 3.

For example, where the first wireless communication system is a UWB communication system and the second wireless communication system is a WiMAX communication system having a bandwidth of about 10 MHz, two or three frequency tones of the frequency domain baseband signal may correspond to the frequency band used in the second wireless communication system according to a center frequency of a signal transmitted and/or received in the second wireless communication system. In this case, the bin selector 610 may select two or three bins corresponding to the two or three frequency tones from the plurality of the bins of the frequency domain baseband signal. The bin selector 610 may provide the two or three bins to the correlator 620.

The correlator 620 may receive at least one bin from the bin selector 610, calculate at least one bin-correlation value between the at least one bin received from the bin selector 610 and at least one bin of a correlation sequence where the at least one bin of the correlation sequence corresponds to the at least one bin received from the bin selector 610. The correlator 620 may calculate a correlation value between the frequency domain baseband signal and the correlation sequence based on the at least one bin-correlation value. In some embodiments, at least one frequency tone corresponding to the at least one bin of the correlation sequence may be the same as at least one frequency tone corresponding to the at least one bin received from the bin selector 610. For example, when the correlator 620 receives two bins from the bin selector 610, the correlator 620 may calculate two bin-correlation values between the two bins received from the bin selector 610 and two bins of the correlation sequence where the two bins of the correlation sequence correspond to the two bins received from the bin selector 610, respectively, and calculate the correlation value by multiplying the two bin-correlation values. The decision unit 630 may receive the correlation value from the correlator 620 and determine whether the second wireless communication system is a victim system based on the correlation value.

Figure 7:
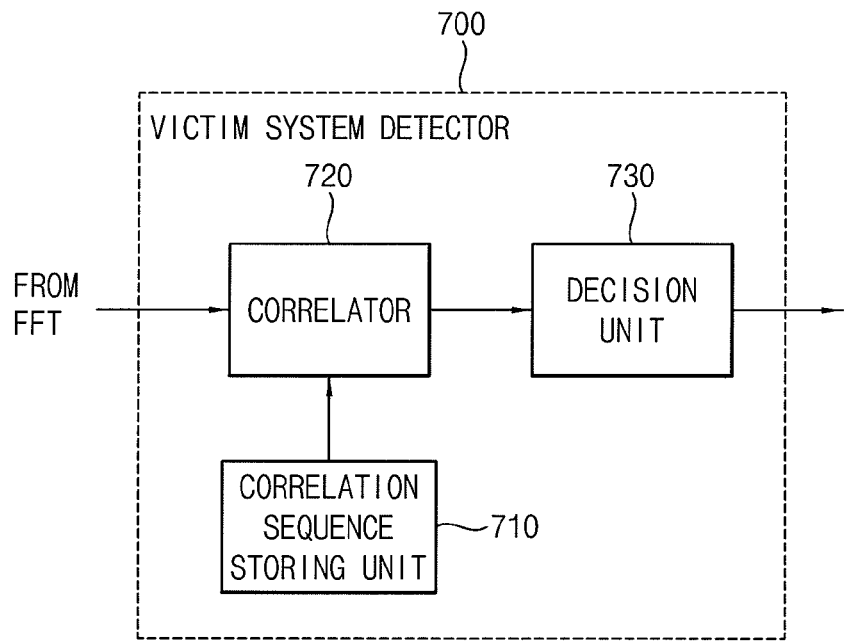
FIG. 7 is a block diagram illustrating a victim system detector according to some exemplary embodiments.

FIG. 7 is a block diagram illustrating a victim system detector according to some exemplary embodiments.

Referring to FIG. 7, the victim system detector 700 includes a correlation sequence storing unit 710, a correlator 720 and a decision unit 730. For example, the victim system detector 700 may be the victim system detector 235 included in the wireless communication device 200 of FIG. 2 or the victim system detector 343 included in the wireless communication device 300 of FIG. 3. Compared to the victim system detector 500 of FIG. 5, the victim system detector 700 further includes the correlation sequence storing unit 710.

The correlation sequence storing unit 710 may store a correlation sequence of a victim system. The correlator 720 may read the correlation sequence from the correlation sequence storing unit 710 and calculate a correlation value between a frequency domain baseband signal and the correlation sequence. The decision unit 730 may determine whether the second wireless communication system is a victim system based on the correlation value.

In some embodiments, the correlation sequence storing unit 710 may store a plurality of correlation sequences of a plurality of victim systems. For example, the correlation sequence storing unit 710 may store a first correlation sequence of a second wireless communication system and a second correlation sequence of a third wireless communication system where a communication standard of the second wireless communication system is different from a communication standard of the third wireless communication system and the correlator 720 may selectively read the first correlation sequence or the second correlation sequence form the correlation sequence storing unit 710. The correlator 720 may calculate a correlation value between the frequency domain baseband signal of a first wireless communication system and the first correlation sequence or between the frequency domain baseband signal and the second correlation sequence. The decision unit 730 may determine, based on the correlation value, whether the second wireless communication system is a victim system and/or whether the third wireless communication system is a victim system. Accordingly, the victim system detector 700 may detect the existence of multiple victim systems. Further, when a victim system to be detected is newly added, the victim system detector 700 may adaptively detect the added victim system by appending a correlation sequence of the added victim system to at least one correlation sequence stored in the correlation sequence storing unit 710.

In some embodiments, a correlation sequence stored in the correlation sequence storing unit 710 may consist of at least one bin within a frequency band for a victim system. The correlator 720 may calculate at least one bin-correlation value between at least one bin of the frequency domain baseband signal and the at least one bin stored in the correlation sequence storing unit 710 where the at least one bin of the frequency domain baseband signal is also within the frequency band for the victim system. The correlator 720 may calculate the correlation value based on the at least one bin-correlation value. Accordingly, the victim system detector 700 may be implemented with the correlation sequence storing unit 710 having small capacity and/or a small size and the correlator 720 may calculate the correlation value more quickly.

Figure 8:
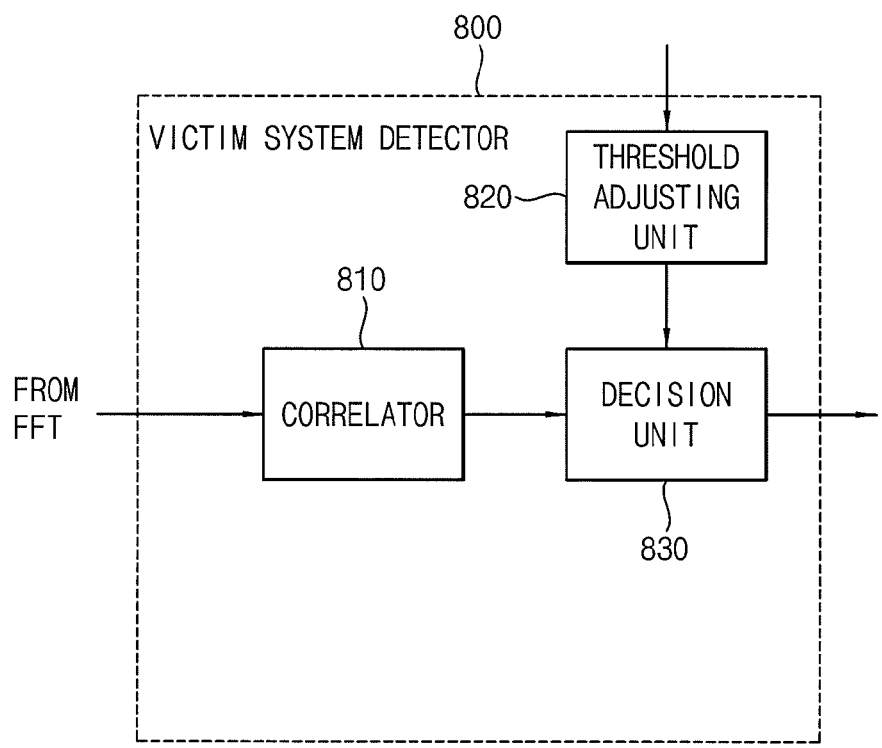
FIG. 8 is a block diagram illustrating a victim system detector according to some exemplary embodiments.

FIG. 8 is a block diagram illustrating a victim system detector according to some exemplary embodiments.

Referring to FIG. 8, the victim system detector 800 includes a correlator 810, a threshold adjusting unit 820 and a decision unit 830. For example, the victim system detector 800 may be the victim system detector 235 included in the wireless communication device 200 of FIG. 2 or the victim system detector 343 included in the wireless communication device 300 of FIG. 3. Compared to the victim system detector 500 of FIG. 5, the victim system detector 800 further includes the threshold adjusting unit 820.

The correlator 810 may calculate a correlation value between a frequency domain baseband signal associated with a first wireless communication system and a correlation sequence of a second wireless communication system.

The threshold adjusting unit 820 may generate or adjust a threshold value based on communication information provided from an external device, such as the MAC 350 illustrated in FIG. 3. In some embodiments, the communication information may include received signal strength information, channel state information, and/or bandwidth information. For example, the threshold adjusting unit 820 may generate the threshold value increased or decreased according to the quality of a communication channel of the second wireless communication system.

The decision unit 830 may receive the threshold value from the threshold adjusting unit 820 and determine whether the second wireless communication system is a victim system by comparing the correlation value received from the correlator 810 with the threshold value. For example, the decision unit 830 may determine that the second wireless communication system is a victim system when the correlation value is higher than the threshold value.

The victim system detector 800 according to some exemplary embodiments may accurately detect the existence of the victim system by adaptively adjusting the threshold value.

Figure 9:
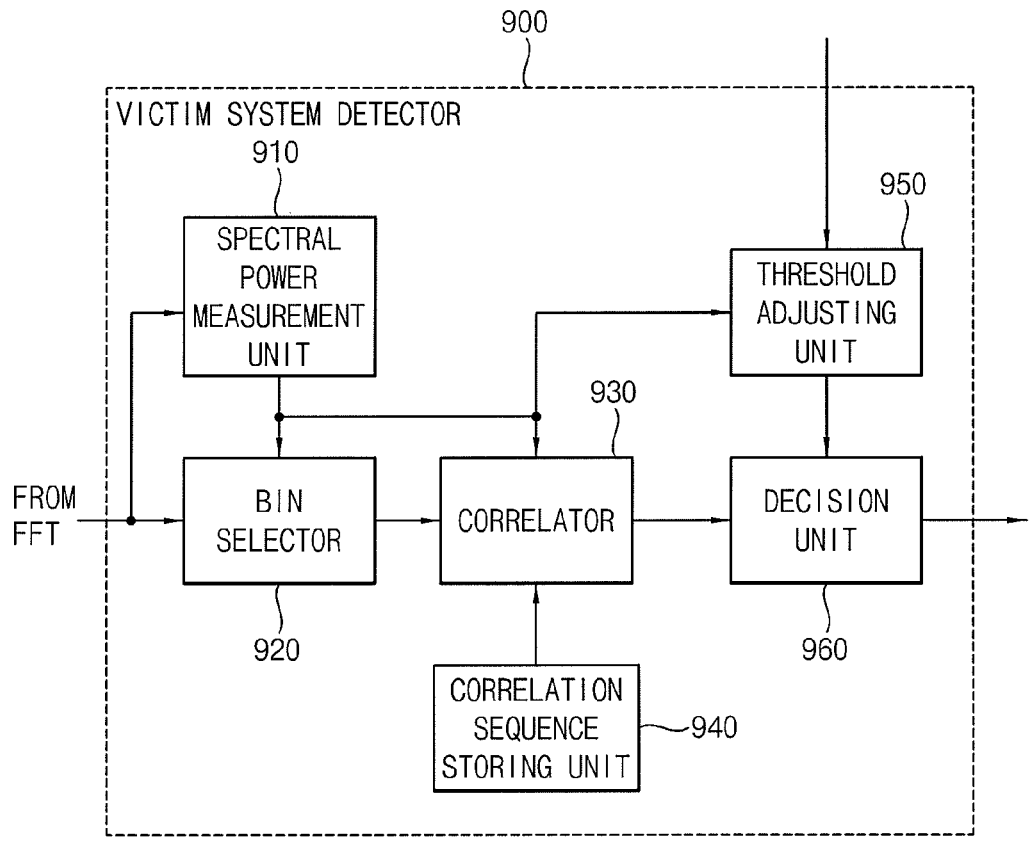
FIG. 9 is a block diagram illustrating a victim system detector according to some exemplary embodiments.

FIG. 9 is a block diagram illustrating a victim system detector according to some exemplary embodiments.

Referring to FIG. 9, the victim system detector 900 includes a spectral power measurement unit 910, a correlator 930 and a decision unit 960. In some embodiments, the victim system detector 900 may further include a bin selector 920, a correlation sequence storing unit 940 and a threshold adjusting unit 950. For example, the victim system detector 900 may be the victim system detector 235 included in the wireless communication device 200 of FIG. 2 or the victim system detector 343 included in the wireless communication device 300 of FIG. 3.

The spectral power measurement unit 910 may measure the power of a frequency domain baseband signal associated with a first wireless communication system for each frequency band, and generate type information about a second wireless communication system, or a victim system, based on the measured power. In some embodiments, the spectral power measurement unit 910 may divide the frequency domain baseband signal into a plurality of signals which correspond to different frequency bands and measure the power of each of the divided signals. For example, the spectral power measurement unit 910 may receive the frequency domain baseband signal from the frequency domain converter 342 illustrated in FIG. 3.

In some embodiments, the spectral power measurement unit 910 may measure power of the frequency domain baseband signal associated with the first wireless communication system for each frequency tone, and determine at least one frequency tone having a power level higher than a predetermined level. The spectral power measurement unit 910 may extract a victim system in which a signal having a bandwidth corresponding to the at least one frequency tone is transmitted and/or received, and generate the type information representing the type of the extracted victim system.

The bin selector 920 may receive the type information from the spectral power measurement unit 910 and select at least one bin corresponding to a frequency band used in the victim system from a plurality of bins of the frequency domain baseband signal based on the type information. The correlator 930 may receive the type information from the spectral power measurement unit 910 and read a correlation sequence of the victim system corresponding to the type information from the correlation sequence storing unit 940. The correlator 930 may receive the at least one bin from the bin selector 920 and calculate a correlation value between the at least one bin and the correlation sequence. The threshold adjusting unit 950 may generate a threshold value based on communication information provided from an external device and/or the type information provided from the spectral power measurement unit 910. The decision unit 960 may receive the threshold value from the threshold adjusting unit 950 and determine whether or not the victim system exists by comparing the correlation value received from the correlator 930 with the threshold value.

In some embodiments, where a frequency tone having a power level higher than the predetermined level does not exist, the spectral power measurement unit 910 may generate the type information representing that no victim system have been detected. In this case, the victim system detector 900 may operate in idle mode. For example, when the bin selector 920 receives the type information representing the non-existence of the victim system, the bin selector 920 may not provide the selected bin to the correlator 930, the correlator 930 may not read the correlation sequence from the correlation sequence storing unit 940, and the threshold adjusting unit 950 may not generate the threshold value. Accordingly, the victim system detector 900 may reduce power consumption.

As described above, the victim system detector according to some exemplary embodiments need not include a filtering circuit and a down-sampling circuit for recovering a victim system signal since the second wireless communication system or the victim system is detected by using the correlation value that is calculated in the frequency domain associated with the first wireless communication system. Accordingly, the victim system detector according to some exemplary embodiments may have a small size and/or low hardware complexity. The victim system detector according to some exemplary embodiments may accurately and efficiently detect the victim system by using the victim system signal having a periodic characteristic.

Figure 10:
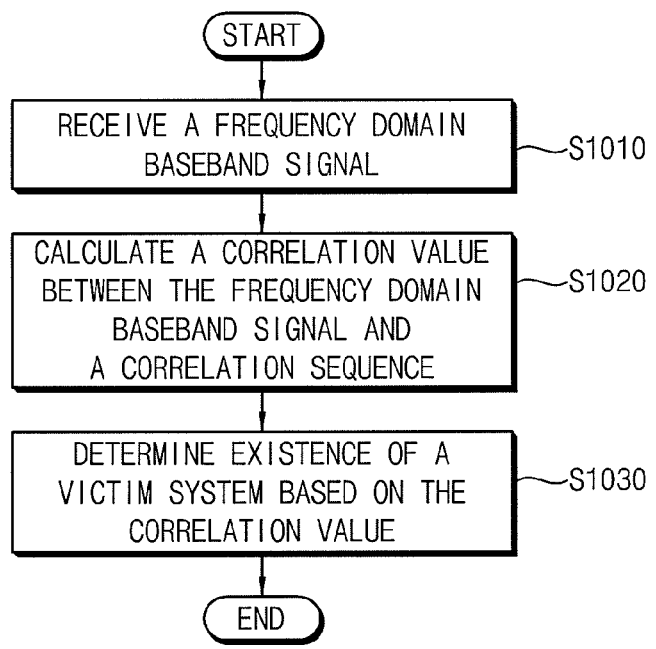
FIG. 10 is a flow chart illustrating a method of detecting a victim system according to some exemplary embodiments.

FIG. 10 is a flow chart illustrating a method of detecting a victim system according to some exemplary embodiments.

Referring to FIGS. 5 and 10, a correlator 510 may receive a frequency domain baseband signal of a first wireless communication system (step S1010), and the correlator 510 may calculate a correlation value between the frequency domain baseband signal and a correlation sequence of a second wireless communication system (step S1020). A decision unit 520 may receive the correlation value from the correlator 510 and determine whether the second wireless communication system is a victim system (step S1030). Accordingly, the second wireless communication system may be accurately and efficiently detected as the victim system.

Figure 11:
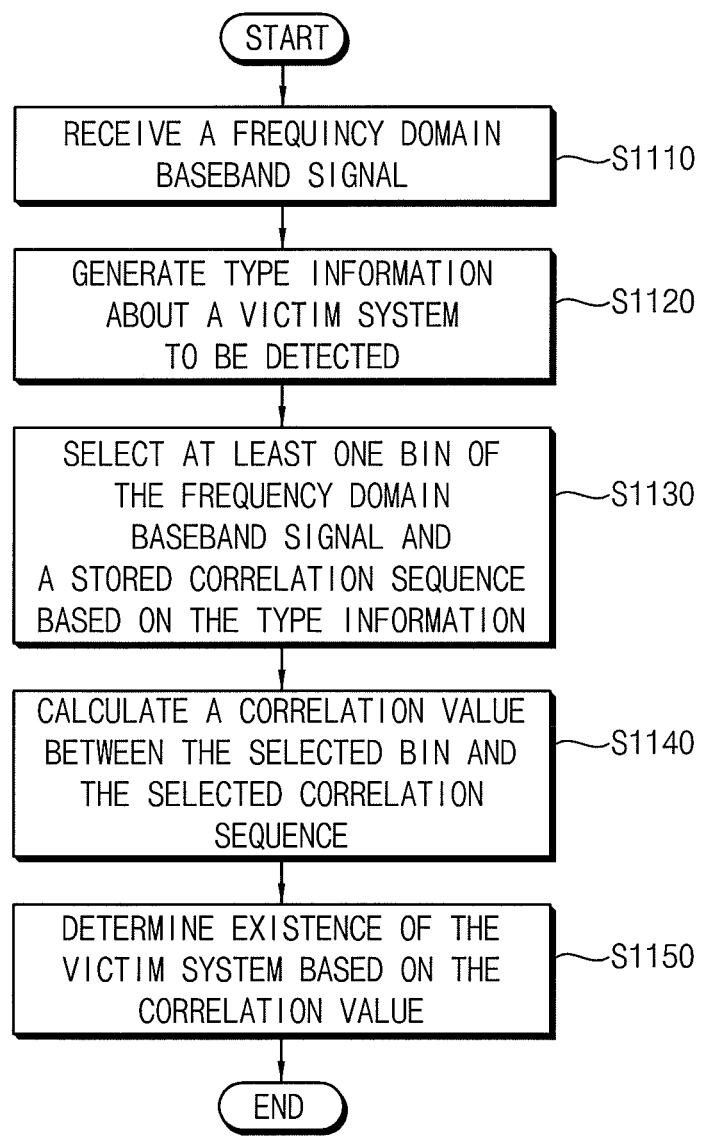
FIG. 11 is a flow chart illustrating a method of detecting a victim system according to some exemplary embodiments.

FIG. 11 is a flow chart illustrating a method of detecting a victim system according to some exemplary embodiments.

Referring to FIGS. 9 and 11, a spectral power measurement unit 910 and a bin selector 920 may receive a frequency domain baseband signal of a first wireless communication system (step S1110). The spectral power measurement unit 910 may measure the power of the frequency domain baseband signal for each frequency band and generate type information about a second wireless communication system based on the measured power (step S1120). The bin selector 920 may select at least one bin corresponding to a frequency band used in the second wireless communication system from a plurality of bins of the frequency domain baseband signal based on the type information. A correlator 930 may read a correlation sequence of the second wireless communication system from a correlation sequence storing unit 940 based on the type information (step S1130). The correlator 930 may calculate a correlation value between the at least one bin received from the bin selector 920 and the correlation sequence read from the correlation sequence storing unit 940 (step S1140). A threshold adjusting unit 950 may generate a threshold value based on communication information provided from an external device and/or the type information provided from the spectral power measurement unit 910. The decision unit 960 may determine whether the second wireless communication system is a victim system by comparing the correlation value with the threshold value received from the threshold adjusting unit 950 (step S1150). Accordingly, the second wireless communication system may be accurately and efficiently detected as the victim system.

Figure 12:
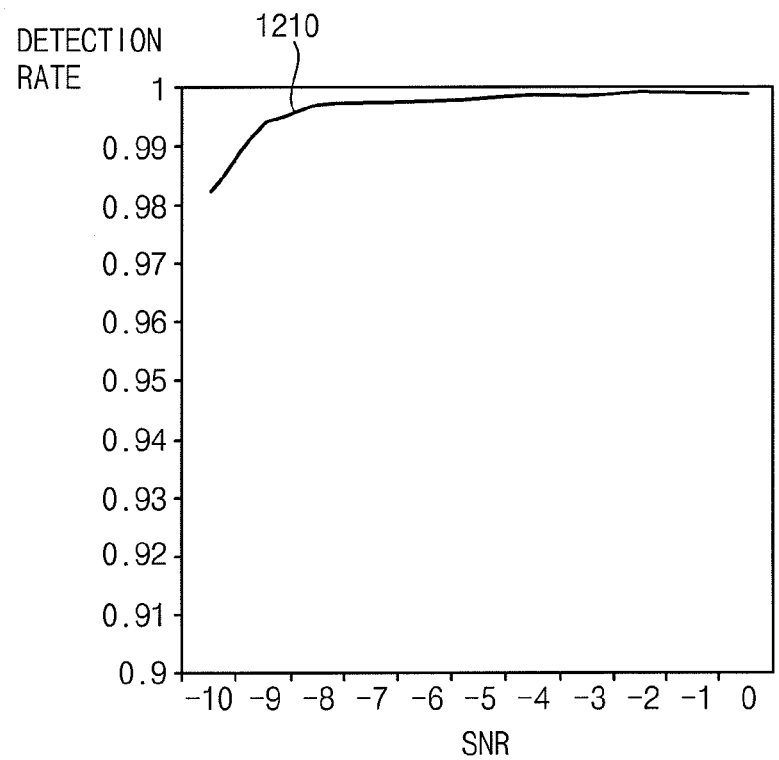
FIG. 12 is a graph illustrating performance of a victim system detector according to some exemplary embodiments.

FIG. 12 is a graph illustrating performance of a victim system detector according to some exemplary embodiments.

In FIG. 12, a performance line 1210 represents rates of victim system detection according to signal-to-noise ratio (SNR) indicating strength of a victim system signal with respect to noise.

Referring to FIG. 12, when the SNR is about −6 dB, the victim system detector according to some exemplary embodiments may successfully detect the victim system at a rate of about 100%. When the SNR is about −10 dB, the victim system detector according to some exemplary embodiments may successfully detect the victim system at a rate of about 98%. Therefore, the victim system detector according to some exemplary embodiments may accurately detect the victim system.

Figure 13:
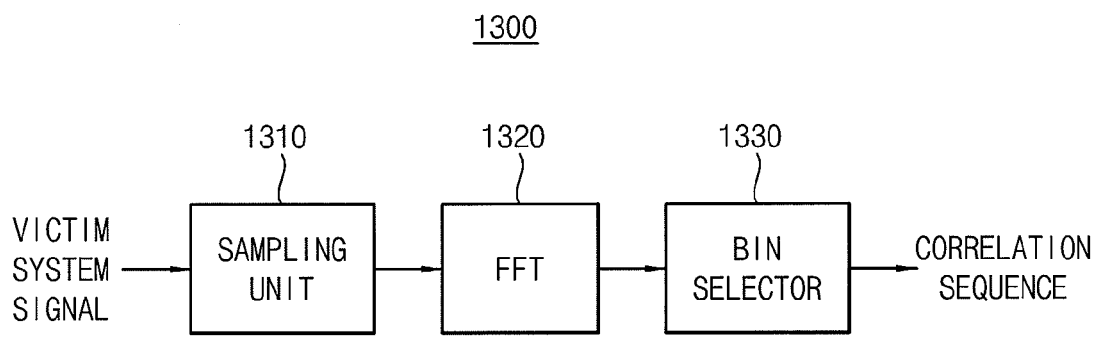
FIG. 13 is a block diagram illustrating a correlation sequence generating device according to some exemplary embodiments.

FIG. 13 is a block diagram illustrating a correlation sequence generating device according to some exemplary embodiments.

Referring to FIG. 13, the correlation sequence generating device 1300 includes a sampling unit 1310, a frequency domain converter 1320 and a bin selector 1330.

The sampling unit 1310 may sample a victim system signal that is a periodic signal in a time domain. In some embodiments, the victim system signal to be sampled may be a preamble signal of a victim system. In some embodiments, the victim system signal may be an analog signal and the sampling unit 1310 may be an ADC. In other embodiments, the victim system signal may be a digital signal and the sampling unit 1310 may be a unit for adjusting the number of samples of the victim system signal by digital signal processing. The sampling unit 1310 may adjust a bandwidth of the victim system signal into a bandwidth of a wireless signal transmitted and/or received in a wireless communication system that detects and avoid the victim system.

For example, where a UWB communication system detects a WiMAX communication system as the victim system, the sampling unit 1310 may over-sample a preamble signal of the WiMAX communication system, thereby expanding a bandwidth of the preamble signal to about 528 MHz. The preamble signal of the WiMAX communication system may consist of 640 samples. Since the preamble signal of the WiMAX communication system has two symbols in the time domain, one time domain symbol of the WiMAX communication system consists of 256 samples and one guard of the WiMAX communication system consists of 32 samples. For example, when the bandwidth of the WiMAX communication system is about 10 MHz, the sampling unit 1310 may sample the preamble signal at an oversampling rate of about 52.8. Thus, the sampling unit 1310 may output a digital signal having 33,792 samples, of which the bandwidth is expanded.

The frequency domain converter 1320 may convert the sampled victim system signal into a frequency domain signal. The frequency domain converter 1320 may convert the sampled victim system signal according to a communication standard of the wireless communication system that detects the victim system. For example, the sampled victim system signal may be converted into the frequency domain signal in a manner used in the wireless communication system that detects the victim system. In some embodiments, the frequency domain converter 1320 may be a FFT.

For example, where the UWB communication system detects the WiMAX communication system having the bandwidth of about 10 MHz as a victim system, the frequency domain converter 1320 may receive the digital signal having 33,792 samples from the sampling unit 1310. Since one symbol of the UWB communication system has 165 samples, the digital signal may be interpreted to include about 205 symbols in the UWB communication system. Accordingly, since a frequency domain baseband signal of the UWB communication system consists of 128 frequency tones, the frequency domain converter 1320, which converts the sampled victim system signal according to a communication standard of the wireless communication system (e.g., the UWB communication system) that detects the victim system (e.g., the WiMAX communication system), may output 128 bins of which each has about 205 samples.

The bin selector 1330 may select at least one bin corresponding to the frequency band used in the victim system as a correlation sequence from the frequency domain signal received from the frequency domain converter 1320.

For example, where the UWB communication system detects the WiMAX communication system having the bandwidth of about 10 MHz as the victim system, two or three frequency tones of the UWB communication system may be within the frequency band used in the WiMAX communication system according to a center frequency of a WiMAX communication system signal. In this case, the bin selector may select two or three bins corresponding to the two or three frequency tones as the correlation sequence of the WiMAX communication system from the 128 bins of the frequency domain signal received from the frequency domain converter 1320.

In some embodiments, the correlation sequence generating device 1300 may be implemented as an independent device. In other embodiments, the correlation sequence generating device 1300 may be implemented in the wireless communication device 200 of FIG. 2 or the wireless communication device 300 of FIG. 3. In some embodiments, a baseband processor included in a wireless communication device may operate as the correlation sequence generating device 1300 in a specific mode. For example, in the specific mode, the ADC 341 illustrated in FIG. 3 may operate as the sampling unit 1310, the frequency domain converter 342 illustrated in FIG. 3 may operate as the frequency domain converter 1310, and the bin selector included in the victim system detector 343 illustrated in FIG. 3 may operate as the bin selector 1330.

Since the correlation sequence generating device 1300 generates the correlation sequence of the victim system by using the victim system signal having a periodic characteristic, the correlation sequence may have a high auto-correlation value. The wireless communication system according to some exemplary embodiments may accurately and efficiently determine whether a wireless signal includes the victim system signal by calculating a cross-correlation value between the wireless signal and the correlation sequence having the high auto-correlation value.

Figure 14:
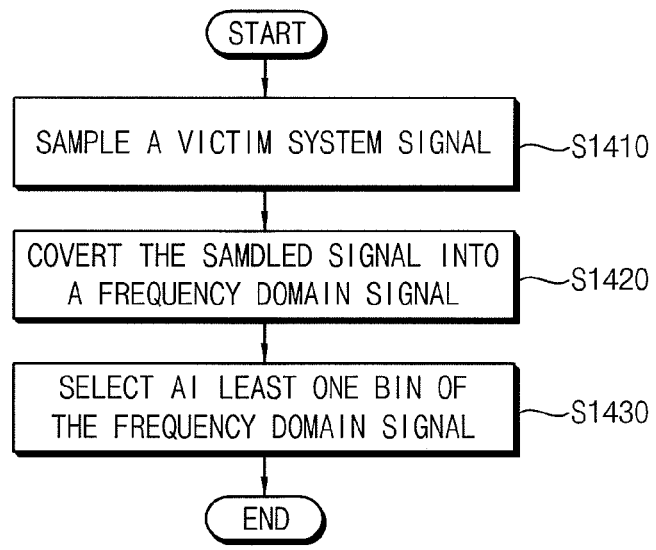
FIG. 14 is a flow chart illustrating a method of generating a correlation sequence according to some exemplary embodiments.

FIG. 14 is a flow chart illustrating a method of generating a correlation sequence according to some exemplary embodiments.

Referring to FIGS. 13 and 14, a sampling unit 1310 may sample a victim system signal (step S1410). A frequency domain converter 1320 may convert the sampled victim system signal into a frequency domain signal (step S1420). A bin selector 1330 may select at least one bin corresponding to a frequency band used in a victim system from a plurality of bins of the frequency domain signal as the correlation sequence (step S1430). Accordingly, the correlation sequence having a high auto-correlation value may be generated.

Figure 15:
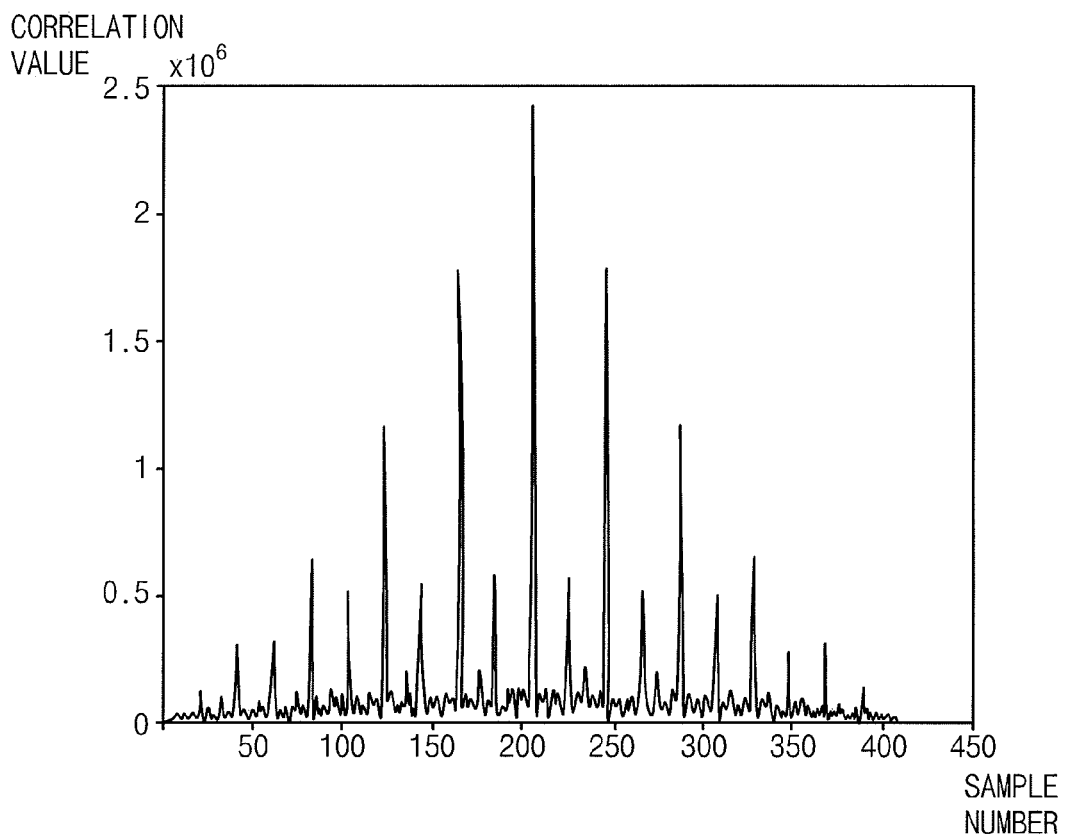
FIG. 15 is a graph illustrating auto-correlation values of a correlation sequence according to sample numbers of a bin of the correlation sequence.

FIG. 15 is a graph illustrating auto-correlation values of a correlation sequence according to sample numbers of a bin of the correlation sequence.

Referring to FIG. 15, the correlation sequence generated by the correlation sequence generating device 1300 of FIG. 13 may have a high auto-correlation value. For example, the correlation sequence including a bin of 205 samples may have an auto-correlation value of about $2.5*10^6$. In some embodiments, the number of samples may be selected such that the correlation sequence may have a high auto-correlation value.

The wireless communication system according to some exemplary embodiments may accurately and efficiently detect the victim system by calculating the cross-correlation value between a frequency domain baseband signal and the correlation sequence having the high auto-correlation value.

Figure 16:
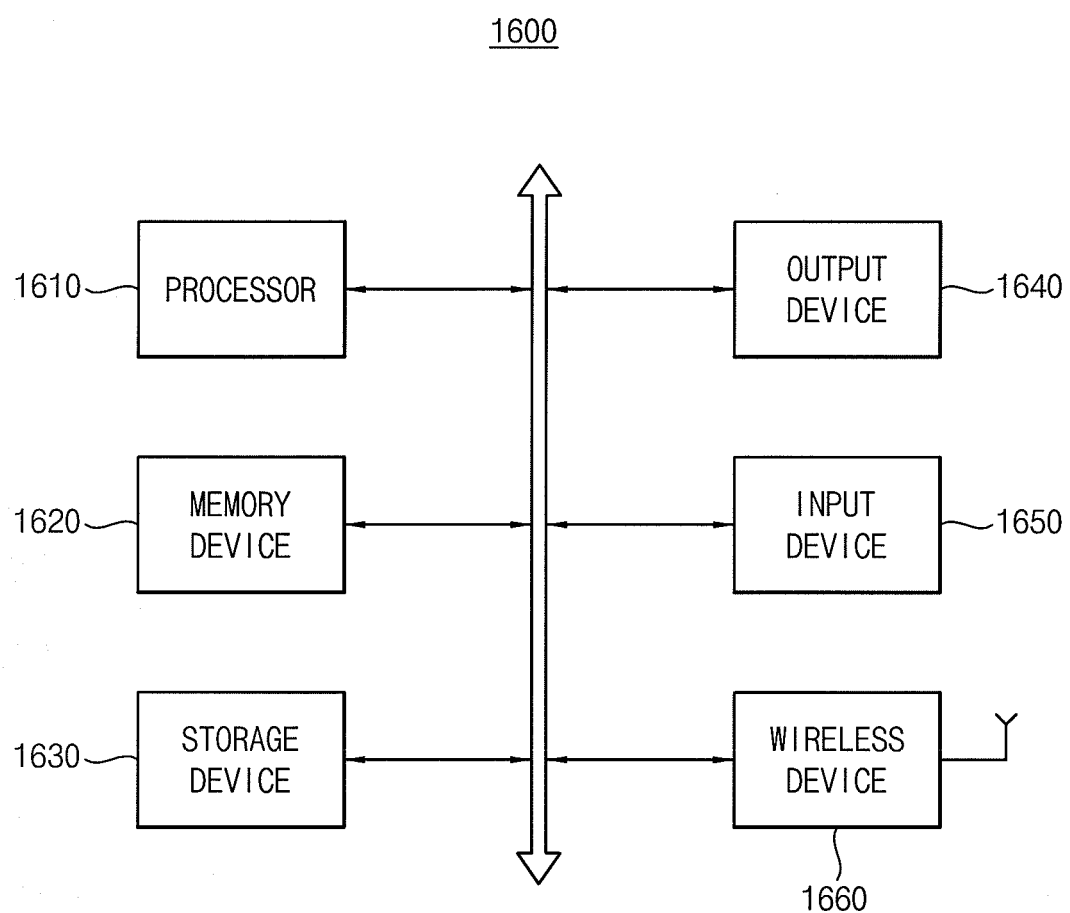
FIG. 16 is a block diagram illustrating a computing system including a wireless communication device according to some exemplary embodiments.

FIG. 16 is a block diagram illustrating a computing system including a wireless communication device according to some exemplary embodiments.

Referring to FIG. 16, the computing system 1600 includes a processor 1610, a memory device 1620 and a wireless communication device 1660. In some embodiments, the computing system 1600 may further include a storage device 1630, an output device 1640 and an input device 1650.

The processor 1610 may perform various computing functions, such as executing specific software for performing specific calculations or tasks. For example, the processor 1610 may be a microprocessor or a central process unit (CPU). The processor 1610 may be coupled to the memory device 1620 via an address bus, a control bus and/or a data bus. For example, the memory device 1620 may be a dynamic random access memory (DRAM), a static random access memory (SRAM), or a non-volatile memory, such as an erasable programmable read-only memory (EPROM), an electrically erasable programmable read-only memory (EEPROM), or the like. The processor 1610 may be coupled to an expansion bus, such as a peripheral-component-interconnect (PCI) bus. The processor 1610 may control the input device 1650 (e.g., a keyboard or a mouse), the output device 1640 (e.g., a printer or a display device) and the storage device 1630 (e.g., a hard disk drive or a compact disk read-only memory (CD-ROM)).

The victim system detector, the method of detecting a victim system, the wireless communication device and the wireless communication method according to some exemplary embodiments may be applicable to any computing system, such as a universal serial bus (USB) device, a portable storage device, a printer, a camera, a mobile phone, a game machine, a vehicle, a computer, a speaker, a video device, a television, a home appliance, or the like.

As described above, the victim system detector, the method of detecting a victim system, the wireless communication device and the wireless communication method according to some exemplary embodiments may have a small size by calculating the correlation value in the frequency domain, and may accurately and efficiently detect the victim system.

The foregoing is illustrative of exemplary embodiments and is not to be construed as limiting. Although a few exemplary embodiments have been described, those skilled in the art will readily appreciate that many modifications are possible in the exemplary embodiments without materially departing from the present invention.

What is claimed is:

1. A system for detecting wireless communication systems using overlapping frequency bands, the detection system included in a baseband processor, the detection system comprising:
    a correlator coupled to an output of a frequency domain converter included in the baseband processor, the correlator configured to receive a frequency domain baseband signal from the frequency domain converter, and configured to calculate a correlation value between the frequency domain baseband signal associated with a first wireless communication system and a correlation sequence of a second wireless communication system; and
    a decision unit configured to determine, based on the calculated correlation value, whether the second wireless communication system uses frequency bands that are used by the first wireless communication system.

2. The detection system of claim 1, wherein the frequency domain baseband signal is generated by converting a wireless signal received in the first wireless communication system.

3. The detection system of claim 1, wherein the correlation sequence is generated by converting a periodic signal of the second wireless communication system into a frequency domain signal.

4. The detection system of claim 1, wherein the correlation sequence is generated by converting a preamble signal of the second wireless communication system into a frequency domain signal.

5. The detection system of claim 1, wherein the correlator calculates at least one bin-correlation value between at least one bin of the frequency domain baseband signal corresponding to a frequency band used in the second wireless communication system and at least one bin of the correlation sequence corresponding to a frequency band used in the first wireless communication system, and calculates the correlation value based on the at least one bin-correlation value.

6. The detection system of claim 1, wherein the correlator calculates a plurality of bin-correlation values between a plurality of bins of the frequency domain baseband signal and a plurality of bins of the correlation sequence where the plurality of bins of the frequency domain baseband signal correspond to the plurality of bins of the correlation sequence, respectively, and calculates the correlation value based on the plurality of bin-correlation values.

7. The detection system of claim 6, wherein the correlator calculates the correlation value by multiplying the plurality of bin-correlation values.

8. The detection system of claim 6, wherein the correlator calculates the correlation value by summing the plurality of bin-correlation values.

9. The detection system of claim 1, further comprising:
a bin selector configured to select at least one bin of the frequency domain baseband signal corresponding to a frequency band used in the second wireless communication system from a plurality of bins of the frequency domain baseband signal.

10. The detection system of claim 9, wherein the correlator:
receives the at least one bin of the frequency domain baseband signal from the bin selector;
calculates at least one bin-correlation value between the at least one bin of the frequency domain baseband signal and at least one bin of the correlation sequence where the at least one bin of the correlation sequence corresponds to the at least one bin of the frequency domain baseband signal; and
calculates the correlation value based on the at least one bin-correlation value.

11. The detection system of claim 1, further comprising:
a correlation sequence storing unit configured to store the correlation sequence of the second wireless communication system.

12. The detection system of claim 11, wherein the correlation sequence storing unit further stores at least one correlation sequence of at least one wireless communication system having a communication standard that is different from a communication standard of the second wireless communication system.

13. The detection system of claim 1, further comprising:
a threshold adjusting unit configured to generate a threshold value based on communication information provided from an external device,
wherein the decision unit receives the threshold value from the threshold adjusting unit and determines, by comparing the correlation value with the threshold value, whether the second wireless communication system uses a frequency band that overlaps with a frequency band used by the first wireless communication system.

14. The detection system of claim 13, wherein the decision unit determines that the second wireless communication system uses a frequency band that overlaps with a frequency band used by the first wireless communication system when the correlation value is higher than the threshold value.

15. The detection system of claim 13, wherein the communication information includes one or more of received signal strength information, channel state information, or bandwidth information.

16. The detection system of claim 1, further comprising:
a spectral power measurement unit configured to measure power of the frequency domain baseband signal, and configured to generate type information of the second wireless communication system based on the measured power.

17. The detection system of claim 16, further comprising:
a correlation sequence storing unit configured to store the correlation sequence of the second wireless communication system and at least one correlation sequence of at least one wireless communication system having a communication standard that is different from a communication standard of the second wireless communication system; and
a bin selector configured to select, based on the type information, at least one bin of the frequency domain baseband signal from a plurality of bins of the frequency domain baseband signal, the at least one bin of the frequency domain baseband signal selectively corresponding to a frequency band used in the second wireless communication system or a frequency band used in the at least one wireless communication system according to the type information,
wherein the correlator receives the at least one bin of the frequency domain baseband signal from the bin selector, reads a correlation sequence selected from the correlation sequence of the second wireless communication system and the at least one correlation sequence of the at least one wireless communication system from the correlation sequence storing unit according to the type information, and calculates the correlation value between the at least one bin of the frequency domain baseband signal and the selected correlation sequence read from the correlation sequence storing unit.

18. The detection system of claim 16, wherein the detection system operates in an idle mode when the type information represents that the second wireless communication system does not use a frequency band that overlaps with any frequency band used by the first wireless communication system.

19. A method of detecting wireless communication systems using overlapping frequency bands, comprising:
calculating, by a correlator included in a baseband processor, a correlation value between a frequency domain baseband signal associated with a first wireless communication system and a correlation sequence of a second wireless communication system, the correlator coupled to an output of a frequency domain converter included in the baseband processor, and configured to receive the frequency domain baseband signal from the frequency domain converter; and
determining, based on the correlation value, whether the second wireless communication system uses frequency bands that are used by the first wireless communication system,
wherein the steps of calculating the correlation value and determining are performed using a baseband processor.

20. A wireless communication device, comprising:
an antenna configured to receive a wireless signal in a first wireless communication system;
a radio frequency (RF) unit configured to receive the wireless signal from the antenna and configured to convert the wireless signal into a baseband signal, the RF unit including:
an RF filter configured to eliminate an out-of-band spurious component of the wireless signal by filtering the wireless signal;
a low noise amplifier (LNA) configured to amplify the wireless signal filtered by the RF filter; and
a reception mixer configured to down-convert the wireless signal amplified by the LNA into the baseband signal; and
a baseband processor configured to perform a data processing operation based on the baseband signal, the baseband processor including:
an analog-digital converter (ADC) configured to convert the baseband signal into a digital baseband signal;
a frequency domain converter configured to convert the digital baseband signal into a frequency domain baseband signal; and
a victim system detector coupled to an output of the frequency domain converter, the victim system detector configured to receive the frequency domain baseband signal from the frequency domain converter, configured to calculate a correlation value between the frequency domain baseband signal and a correlation sequence of a second wireless communication system and configured to determine, based on the correlation value, whether the second wireless communication system uses frequency bands that are used by the first wireless communication system.

21. The wireless communication device of claim 20, wherein the baseband processor further includes:
an interference avoidance unit configured to reduce interference with the second wireless communication system when the second wireless communication system uses frequency bands that are used by the first wireless communication system.

22. The wireless communication device of claim 21, wherein the interference avoidance unit includes:
a notch filter configured to decrease a power level of a wireless signal to be transmitted in the first wireless communication system in a frequency band used in the second wireless communication system.

23. The wireless communication device of claim 20, further comprising:
a correlation sequence generating device, including:
a sampling unit configured to sample a periodic signal of the second wireless communication system;
a frequency domain converter configured to convert the sampled periodic signal into a frequency domain signal; and
a bin selector configured to select at least one bin corresponding to a frequency band used in the second wireless communication system from a plurality of bins of the frequency domain signal as the correlation sequence.

24. The wireless communication device of claim 23, wherein the sampling unit adjusts a bandwidth of the sampled periodic signal to a bandwidth for the first wireless communication system.

25. The wireless communication device of claim 23, wherein the sampled periodic signal is a preamble signal of the second wireless communication system.

26. A wireless communication method, comprising:
receiving a wireless signal in a first wireless communication system;
converting the wireless signal into a baseband signal;
converting the baseband signal into a digital baseband signal;
converting, by a frequency domain converter, the digital baseband signal into a frequency domain baseband signal;
calculating, by a victim system detector, a correlation value between the frequency domain baseband signal and a correlation sequence of a second wireless communication system, the victim system detector coupled to an output of the frequency domain converter, and configured to receive the frequency domain baseband signal from the frequency domain converter;
determining, based on the correlation value, whether the second wireless communication system uses frequency bands that are used by the first wireless communication system; and
reducing interference with the second wireless communication system when the second wireless communication system uses frequency bands that are used by the first wireless communication system.

27. The wireless communication device of claim 20, wherein the baseband processor further includes:
a time domain converter configured to convert a frequency domain baseband transmission signal into a digital baseband transmission signal;
a victim system avoidance unit configured to reduce a power level of the digital baseband transmission signal in a frequency band used in the second wireless communication system based on a result of the determination by the system detector; and
a digital-analog converter (DAC) configured to receive the digital baseband transmission signal of which the power level is reduced in the frequency based used in the second wireless communication system, and configured to convert the digital baseband transmission signal into a baseband transmission signal,
wherein the RF unit further includes:
a transmission mixer configured to up-convert the baseband transmission signal provided from the DAC into a wireless transmission signal;
a power amplifier (PA) configured to amplify the wireless transmission signal; and
a switch configured to connect the RF filter to the LNA in a reception mode, and configured to connect the RF filter to the PA in a transmission mode, and
wherein, in the transmission mode, the RF filter eliminates an out-of-band spurious component of the wireless transmission signal by filtering the wireless transmission signal, and the antenna transmits the wireless transmission signal provided from the RF filter in the transmission mode.

28. The wireless communication device of claim 20, wherein the wireless communication device is one of a wireless portable device, a wireless mobile device, a portable computer, a mobile computer, a universal serial bus (USB) device, a portable storage device, a printer, a camera, a mobile phone, a game machine, a vehicle, a computer, a speaker, a video device, a television and a home appliance.

* * * * *